United States Patent [19]

Lemieux

[11] 3,765,270
[45] Oct. 16, 1973

[54] MULTIPLE RATIO POWER TRANSMISSION MECHANISM WITH AN INFINITELY VARIABLE OVERDRIVE RANGE

[75] Inventor: George E. Lemieux, Livonia, Mich.

[73] Assignee: Ford Motor Company, Dearborn, Mich.

[22] Filed: Apr. 26, 1971

[21] Appl. No.: 137,374

[52] U.S. Cl.................................. 74/690, 74/759
[51] Int. Cl...................... F16h 37/06, F16h 57/10
[58] Field of Search............................. 74/690, 691

[56] References Cited
UNITED STATES PATENTS

| | | | |
|---|---|---|---|
| 2,093,236 | 9/1937 | Dodge et al. | 74/691 X |
| 3,238,816 | 3/1966 | Schottler | 74/690 |
| 3,244,025 | 4/1966 | Francisco | 74/690 |
| 3,494,224 | 2/1970 | Fellows et al. | 74/691 |
| 3,545,302 | 12/1970 | Schofield | 74/691 |

Primary Examiner—Charles J. Myhre
Assistant Examiner—Thomas C. Perry
Attorney—John R. Faulkner and Donald J. Harrington

[57] ABSTRACT

A multiple ratio power transmission mechanism for use in an automotive vehicle driveline comprising planetary gear units and clutch and brake structure for controlling the relative motion of the elements of the gear units to establish multiple torque ratios including a direct drive ratio and an underdrive ratio, and an infinitely variable overdrive unit having an input portion connected to one element of said gearing, an output portion connected to the power output shaft for the transmission mechanism and a reaction portion adapted to be selectively braked whereby the output shaft may be overdriven with respect to the input shaft throughout a predetermined range of ratios, the lower ratio of the range being close to unity whereby the driveline may be adapted to accommodate varying road loads without frequency upshifting and downshifting between the overdrive range and the direct-drive range.

4 Claims, 4 Drawing Figures

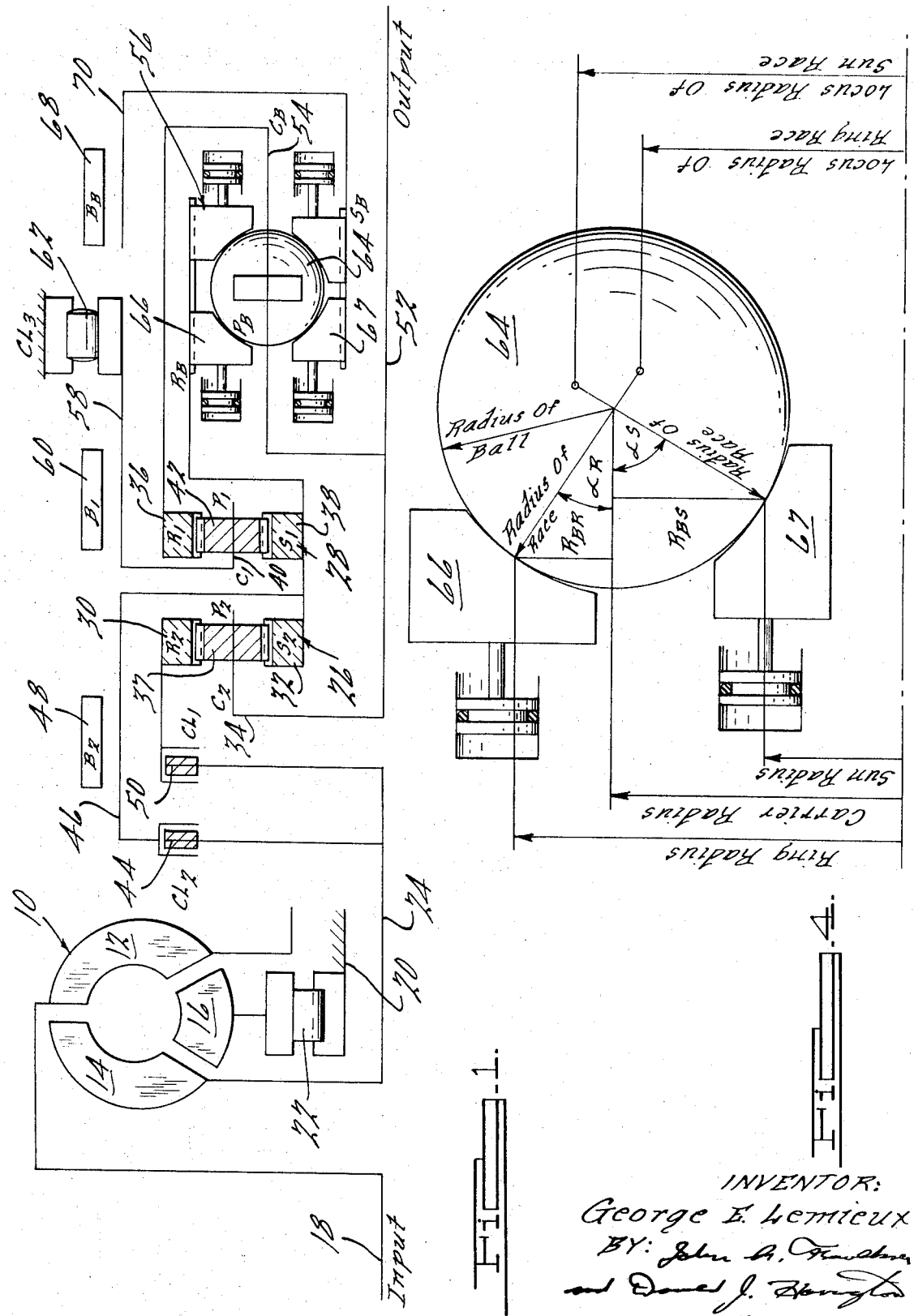

Fig. 1

| | $B_1$ | $B_2$ | $CL_1$ | $CL_2$ | $CL_3$ | $B_B$ | Ratio |
|---|---|---|---|---|---|---|---|
| Man. Low | ON | | | | | | |
| Low | ON | | | | ON | | $2 + \frac{S}{R} = 2.457$ |
| Int. | | ON | | ON | | | $1 + \frac{S}{R} = 1.457$ |
| Direct | | | ON | ON | | | 1.000 |
| Rev. | | ON | | | | ON | $-\frac{R}{S} = -2.1875$ |
| O. Drive | | | ON | | | ON | $1 - \frac{S}{R}\left(\frac{S_B}{R_B}\right)$ Ball Unit S.R. $(N_{RB}/N_{CB})$ May Vary from 1.73 to 2.70 |

Fig. 2

Speeds Relative To Input Speed

| | $S_1$ $S_2$ $R_B$ | $B_1$ $C_1$ $CL_3$ | $P_1$ | $R_2$ | $R_1$ $C_B$ $C_2$ | $P_2$ | $B_2$ | $CH_1$ | $CL_2$ | $S_B$ $B_B$ | $P_B$ | Output | $\alpha_R$ |
|---|---|---|---|---|---|---|---|---|---|---|---|---|---|
| Low | -.890 | 0 | 1.500 | 1.000 | .406 | 2.190 | .890 | 0 | 1.890 | 6.052 / 1.482 | -4.248 / -1.907 | .406 | 74° / 65° |
| Int. | 0 | .471 | .795 | 1.000 | .686 | 1.160 | 0 | 0 | 1.000 | 3.675 / 1.755 | -3.249 / -1.009 | .686 | 74° / 65° |
| Direct | 1.000 | 1.000 | 0 | 1.000 | 1.000 | 0 | 1.000 | 0 | 0 | 1.000 | 0 | 1.000 | |
| Rev. | 1.000 | 0 | -1.685 | -1.173 | -.457 | -2.454 | 1.000 | 2.173 | 0 | -6.804 / -1.667 | 4.776 / 2.143 | -.457 | 74° / 65° |
| O. Drive $N_{RB}/N_{CB}$=1.73 | 1.374 | 1.198 | -.296 | 1.000 | 1.117 | -.433 | 1.374 | 0 | .374 | 0 | .847 | 1.117 | 74° |
| O. Drive $N_{RB}/N_{CB}$=2.70 | 4.873 | 3.049 | -3.077 | 1.000 | 2.715 | -4.477 | 4.873 | 0 | 3.873 | 0 | 3.910 / 2.715 | 2.715 | 65° |
| O. Drive $N_{RB}/N_{CB}$=1.73 | 2.594 | 1.843 | -1.265 | 1.000 | 1.500 | -1.843 | 2.594 | 0 | 1.594 | 0 | 1 | 1.500 | |

INVENTOR:
George E. Lemieux
BY:
ATTORNEYS

MULTIPLE RATIO POWER TRANSMISSION MECHANISM WITH AN INFINITELY VARIABLE OVERDRIVE RANGE

GENERAL DESCRIPTION OF THE INVENTION

The improvements of my invention are adapted to be used in a multiple ratio, geared, power transmission mechanism in an automotive vehicle driveline. It includes an infinitely variable drive having power input portions and power output portions connected to separate elements of the gear system. It also includes a reaction element which may be braked selectively when overdrive operation is desired.

Multiple underdrive ratios are achieved by controlling the relative motion of the elements of the gear system with clutches and brakes in the usual fashion. The overdrive speed range is provided by establishing a compound torque flow path through the gear system and the overdrive unit so that the driven shaft of the transmission mechanism is over-speeded with respect to the input shaft. The overall torque ratio range can be varied when the overdrive unit is active by varying the ratio of the overdrive unit. Compensation thus can be made for changes in road load without the necessity for downshifting the transmission to the direct drive range.

In the particular embodiment of this disclosure, the overdrive unit is a ball friction drive in which the adjustable outer races are connected to one portion of the gear system and the carrier is connected to another. Adjustable inner races may be braked to provide a reaction point for the gear system. The elements of the overdrive unit thus cooperate both functionally and structurally with the individual elements of the gear units to produce an overdrive ratio range in which the overdrive ratio can be varied from a value close to or equal to unity to a limiting overdrive speed ratio. Suitable controls may be used for varying the ratio of the overdrive unit in response to changing driving conditions. Vehicle upshifting and down-shifting between the overdrive range and the direct drive ratio is avoided.

The overdrive function is introduced into the transmission system without requiring the addition of more than one releasable friction torque member.

The gear system of my improved mechanism has portions that are common to the well known Simpson gear system in which two simple planetary gear units form three forward driving torque flow paths and a single reverse torque flow path. The sun gears of the two gear units are connected together or are formed integrally. The carrier of the first unit is connected to the driven shaft as well as to the carrier for the overdrive unit. The carrier for the second gear unit acts as a reaction member during low speed ratio operation. The sun gears, which are braked with a separate intermediate speed ratio brake, act as a reaction point for the transmission during intermediate speed ratio operation.

The sun gears are connected to the adjustable outer races of the infinitely variable unit. The ring gear of the second gear unit is connected to the power output shaft through the carrier for the overdrive unit.

BRIEF DESCRIPTION OF THE FIGURES OF THE DRAWING

FIG. 1 shows in schematic form a geared transmission including an overdrive mechanism with an infinitely variable ratio characteristic;

FIG. 2 is a chart showing the clutch and brake engagement and release pattern for the mechanism of FIG. 1;

FIG. 3 is a chart showing the speeds of the various elements of the mechanism in FIG. 1 relative to the speed of the power input shaft;

FIG. 4 is a diagram showing the geometric relationship of the torque transmitting balls and the cooperating inner and outer races of the infinitely variable mechanism of FIG. 1.

PARTICULAR DESCRIPTION OF THE INVENTION

In FIG. 1 numeral 10 designates a hydrokinetic torque converter comprising bladed impeller 12, a bladed turbine 14 and a bladed stator 16. The impeller, the turbine and the stator are arranged in toroidal fluid flow relationship. The impeller is driven by an engine crankshaft shown schematically at 18. The bladed stator is supported on a stationary sleeve shaft 20. An overrunning brake 22 anchors the stator 16 against rotation in a direction opposite to the direction of rotation of the impeller but permits free-wheeling motion of the stator in the direction of rotation of the impeller during coupling operation.

Turbine 14 is connected to turbine shaft 24. It serves as a torque input shaft for the gear system, which comprises a first simple planetary gear unit 26 and a second simple planetary gear unit 28.

Gear unit 26 includes ring gear 30, sun gear 32, carrier 34 and planet pinions 37 mounted on the carrier 34 in meshing engagement with the sun gear 32 and the ring gear 30. The gear unit 28 is similar to gear unit 26. It includes ring gear 36, sun gear 38, carrier 40 and planet pinions 42 journalled on the carrier 40 in meshing engagement with the sun gear 38 and the ring gear 36. Sun gears 32 and 38 are joined together or formed integrally so that they rotate in unison.

A direct drive and reverse clutch 44 is adapted to connect selectively the shaft 24 to the sun gears. It is applied during operation in the direct-drive, third speed ratio and during reverse drive operation. The driven member of the clutch 44 comprises a drum 46 about which is positioned brake band 48. The brake band 48 is applied during operation in intermediate speed ratio, thus anchoring the sun gear 32 so that it acts as a reaction element during second speed ratio underdrive operation.

A forward drive clutch 50 is adapted to provide selectively a connection between shaft 24 and ring gear 30. It is applied during operation in each of the forward driving ratios. Carrier 34 and ring gear 36 are connected to power output shaft 52. The connection between ring gear 36 and the shaft 52 is through the carrier 54 of an infinitely variable friction drive mechanism 56.

Carrier 40 of the planetary gear unit 28 is connected to brake drum 58. Brake band 60 circles drum 58 and is adapted to be applied during operation in the low speed ratio, thus providing a reaction point. Brake band 60 is complemented by overrunning brake 62 which distributes reaction torque to the transmission housing during low speed ratio operation. Brake band 60 is used during reverse drive and during hill braking operation in the low speed ratio.

The infinitely variable friction drive mechanism 56 includes a plurality of friction drive balls 64 which are journalled rotatably on carrier 54. Outer races 66 engage balls 64 and inner races 67 similarly engage balls 64 at a relatively inwardly spaced location. Races 67 are adapted to be anchored by brake band 68 which surrounds brake drum 70 connected directly to the inner races 67. Reference may be made to U.S. Pat. No. 3,203,278 for a particular description of the mode of operation of a friction drive mechanism similar to that shown at 56.

The races 66 may be moved toward each other and away from each other by fluid pressure operated servos so that the points of contact of the balls with the races will vary from one limiting radial position to a second, radially outward position. The same is true for the races 67. These also may be advanced and retracted with respect to each other so that the points of contact between the races and the balls will be adjusted radially. The radial variation of the location of the points of contact of the balls with respect to the inner and outer races causes a change in the speed ratio of the driving and driven portions of the friction drive mechanism.

The geometric relationship between the balls and the inner and outer races is shown in FIG. 4. The surface of contact between the balls and the races is a curved surface of predetermined contour. The angle $\alpha_R$ indicated in FIG. 4 is the angle between a horizontal reference line and a point drawn between the point of contact between the race and the ball and the center of the ball. In a preferred embodiment the maximum angle formed as the point of contact moves inwardly is 24°. At the other limiting position of the race 66 the angle $\alpha_R$ is 65°. This produces an overdrive ratio of 1.23 to 2.20.

The clutch and brake engagement and release pattern necessary to accomplish various ratio changes is shown in FIG. 2. To establish low speed ratio operation, clutch 50 is applied. It remains applied during operation in each of the other forward driving ratios. Torque then is delivered to the ring gear 30. The resistance to rotation offered by carrier 34 causes reaction torque to be delivered to sun gear 32 and sun gear 38. Carrier 40 is prevented from rotating in a reverse direction by brake 62 thereby causing forward motion of the ring gear 36. This forward motion is distributed to the output shaft 52, thus providing a second torque delivery path that complements the torque delivery path through the first gear unit 26. If manual low operation or hill braking is desired, the brake band is applied so that the carrier 40 can accommodate reaction torque in the opposite direction.

Intermediate speed ratio operation is achieved by engaging brake band 48. This anchors the sun gear 32 causing carrier 34 to rotate at an increased speed ratio as the sun gear 32 acts as a reaction point. Overrunning brake 62 freewheels at this time, thereby rendering the gear unit inactive.

Direct drive operation is achieved by engaging simultaneously clutches 44 and 50. All the elements of the gear system rotate together in unison to establish a 1:1 driving ratio.

Reverse drive operation is achieved by releasing clutch 50 and applying clutch 44. Brake band 60 is applied. Turbine torque then is delivered directly to the sun gear 38. Since the brake band 60 anchors the carrier 40, ring gear 36 is driven in a reverse direction thereby driving the output shaft 52 in a reverse direction.

A change in the operating mode to the overdrive condition is effected by applying brake band 68. This anchors the inner races 67 of the infinitely variable friction drive mechanism 56. Since the inner races now serve as a reaction point and since the carrier 34 drives carrier 54, the outer races 66 are overdriven thereby causing an effective increase in the overall speed ratio. The torque applied to the outer races 66 by the sun gear 32 is opposite to the direction of the torque distributed to the shaft 52 by the carrier 34. The net torque distributed to the shaft 52 is the difference between the torque distributed to the carrier 54 through races 66 and the torque distributed to the shaft 52 by the carrier 34. Thus, the effective torque in shaft 52 is less than the effective turbine torque in shaft 24. Since that is the case, it necessarily follows that the speed of the shaft 52 is greater than the speed of the shaft 24.

In FIG. 3 I have illustrated the speeds of the various elements of the gear system of FIG. 1 with respect to the speed of the input shaft. During direct drive operation the speed of the driven shaft relative to the speed of the driving shaft is 1.00 times input speed. The lowest speed ratio available in the overdrive range is 1.117 times input speed. Thus, the lowest overdrive ratio in the overdrive range is almost equal to the direct drive ratio. The overdrive ratio can be varied up to 2.215 merely by varying the speed ratio of the infinitely variable friction drive mechanism.

Having thus described a preferred form of my invention, what I claim and desire to secure by U.S. Letters Patent is:

1. A power transmission mechanism having multiple underdrive speed ratios, a direct drive ratio and an overdrive range comprising planetary gear units having power input portions, power output portions and torque reaction portions, clutch means for connecting selectively the power input portions of the gear units to a driving shaft, the power output portions of the gear units being connected to a driven shaft, brake means for selectively anchoring said reaction portions, an infinitely variable overdrive unit comprising a torque input member connected to said torque reaction portions and a torque output member connected to said driven shaft, a third member of said infinitely variable overdrive unit being adapted to absorb torque reaction, and overdrive brake means for anchoring said third member of said overdrive unit.

2. The combination as set forth in claim 1 wherein said gear units first and second simple planetary gear units each has a ring gear, a sun gear, a carrier and planet pinions journalled on said carrier in meshing engagement with said sun and ring gears, said clutch means including two separately operable clutches, a first of said clutches being adapted to establish a driving connection between said driving shaft and the ring gear of a first of said gear units, a second of said clutches being adapted to selectively establish a driving connection between the sun gears of said gear units and said driving shaft, said sun gears being connected together, the carrier of said first gear unit being connected to said driven shaft, the ring gear of said second gear unit being connected to the torque output portion of said overdrive unit, the input portion of said overdrive unit being connected to said sun gears, said torque output portion of said overdrive unit being connected to said driven shaft, means for selectively anchoring the carrier of said second gear unit during low speed ratio operation, and other brake means for anchoring the sun gears during intermediate speed ratio operation, both clutches being applied during direct drive operation, the second clutch being released and said overdrive brake means being applied during overdrive operation.

3. The combination as set forth in claim 1 wherein said overdrive unit comprises a ball friction drive having a series of torque transmitting balls, inner races and outer races frictionally contacting said balls, a carrier journalling said balls for rotation about their axes, said carrier for said overdrive unit being connected to said driven shaft and means for varying the radial position of the points of contact of said races with said balls.

4. The combination as set forth in claim 2 wherein said overdrive unit comprises a ball friction drive having a series of torque transmitting balls, inner races and outer races frictionally contacting said balls, a carrier journalling said balls for rotation about their axes, said carrier for said overdrive unit being connected to said driven shaft and means for varying the radial position of the points of contact of said races with said balls.

* * * * *

UNITED STATES PATENT OFFICE
CERTIFICATE OF CORRECTION

Patent No. 3,765,270                    Dated October 16, 1973

Inventor(s)  George E. Lemieux

It is certified that error appears in the above-identified patent and that said Letters Patent are hereby corrected as shown below:

Column 4, line 49, after "gear units" insert --comprise--.

Signed and sealed this 16th day of July 1974.

(SEAL)
Attest:

McCOY M. GIBSON, JR.                    C. MARSHALL DANN
Attesting Officer                       Commissioner of Patents